R. F. ARNOTT.
BALANCING BALLS.
APPLICATION FILED JAN. 13, 1921.
1,424,191.
Patented Aug. 1, 1922.
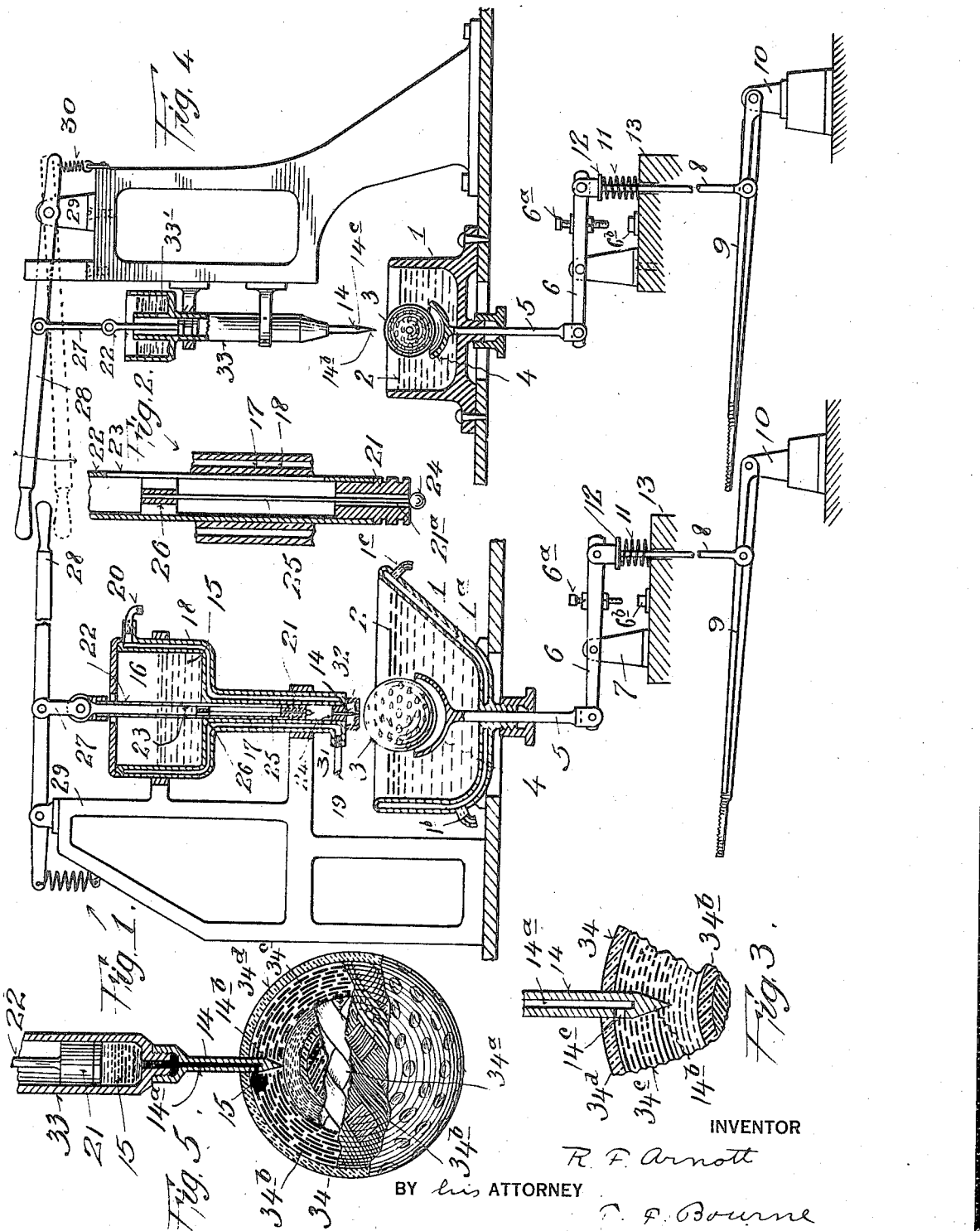
INVENTOR
R. F. Arnott
BY his ATTORNEY
T. F. Bourne

UNITED STATES PATENT OFFICE.

ROBERT FLEMING ARNOTT, OF MONTCLAIR, NEW JERSEY.

BALANCING BALLS.

1,424,191. Specification of Letters Patent. Patented Aug. 1, 1922.

Application filed January 13, 1921. Serial No. 437,079.

*To all whom it may concern:*

Be it known that I, ROBERT F. ARNOTT, a British subject, and resident of Montclair, in the county of Essex and State of New Jersey, have invented certain new and useful Improvements in Balancing Balls, of which the following is a specification.

Some balls as manufactured are frequently out of balance by reason of unevenness in the assembling of the parts, or for other causes, which is particularly disadvantageous with balls used in playing games, such as golf balls. Golf balls are usually made with an inner core of suitable material, a winding on the core of relatively wide bands of rubber, an outer winding of relatively narrow bands of rubber, and an outer cover or shell inclosing the inner core and windings, with the result that some of the balls will be heavier on one side than another causing unevenness in playing, whereby such balls will tend to deviate from a straight line when hit.

The object of my invention is to balance such balls that are found to be out of balance to render them more accurate when used.

In carrying out my invention I first test the balls to ascertain which is the light side thereof and I then load the light side of the ball with a suitable loading or balancing material of sufficient weight to cause that side of the ball to substantially correspond in weight to the opposite or heavier side and thus balance the ball. The ball may be tested by floating it in a suitable fluid bath or solution until it settles still in position with the heavy side of the ball disposed downwards and the lighter side upwards: I then pierce the ball with a suitable instrument for a limited depth and inject through the instrument a relatively heavy material which may be fluid metal, such as a suitable metal or alloy or amalgam, that will flow at a relatively low temperature, or mercury. By preference I employ a suitable metal alloy having a relatively low melting point which will quickly harden or set when cooled. In the case of a golf ball the metal is injected within the outer shell or cover to enter the interstices between said bands near the cover and to remain in place under the impact of blows upon the ball.

My invention further comprises an apparatus for balancing balls comprising a bath for solution in which the balls are floated, a movable support for the balls located within the bath, a hollow instrument or needle to pierce the balls, and means to supply and force balancing material, such as fluid metal, through the instrument or needle into the balls when the latter are opposed and retained in position by said support.

My invention also comprises novel details of improvement that will be more fully hereinafter set forth and then pointed out in the claims.

Reference is to be had to the accompanying drawings forming part hereof, wherein—

Figure 1 is a partly sectional side elevation of an apparatus for carrying out my invention; Fig. 2 is an enlarged detail section of part of Fig. 1; Fig. 3 is an enlarged sectional detail of part of a golf ball and the charging instrument or needle; Fig. 4 is a partly sectional side elevation illustrating a modification, and Fig. 5 is a partly sectional view illustrating a golf ball and means for injecting fluid metal therein.

Similar numerals of reference indicate corresponding parts in the several views.

The numeral 1 indicates an open top receptacle adapted to contain a fluid or solution 2 in which the balls 3 to be balanced may float. At 4 is a support for the balls, shown in cup-like form, movably supported within the bath in receptacle 1 to be depressed to permit the balls to float unobstructedly and to be raised to engage the balls to resist their downward movement when being pierced. The support 4 is shown carried by a rod 5 movable in a stuffing box in the bottom of receptacle 1, which rod is shown pivotally connected to a rock-arm 6 journaled upon a bracket 7, connected by link 8 with foot treadle 9 journaled upon a bracket 10. A spring at 11 shown opposite a stop 12 on link 8 and an abutment 13 serves normally to raise treadle 9 and operate rock-arm 6 to depress support 4 in the bath. When a ball is floating over support 4 treadle 9 may be depressed to raise the support to engage the ball. Axially disposed over the ball is an instrument or needle 14 adapted to pierce the ball. Said instrument or needle is hollow or tubular having a longitudinal bore $14^a$ and having a sharp point $14^b$ to pierce the ball, the outlet $14^c$ of the needle that communicates with bore $14^a$ preferably opening through one side of the needle above its pointed end 14<sup>b</sup>. An adjustable stop 6<sup>a</sup> on arm 6 opposing a stop 6<sup>b</sup> serves to limit the movement of the ball toward and on the needle. Heavy fluid-like material 15 is to be forced through outlet 14<sup>c</sup> of instrument or needle 14 within the ball to balance it. Said material 15 may be any suitable relatively heavy material that will remain where placed. I prefer to use fluid metal, such as a melted alloy, or mercury, or amalgam that may be forced through needle 14 into the ball. The construction illustrated in Fig. 1 is particularly adapted for metal having a low melting point, say below 212° F. A supply reservoir or tank 16 is shown provided with a depending barrel or neck 17 preferably jacketed at 18, having an inlet 19 and outlet 20 for the jacket whereby hot water, steam or the like in the jacket may afford sufficient heat to melt the material 15, and keep it in a molten condition. I have shown a piston or plunger 21 to force the fluid material 15 through needle 14. In the form shown in Figs. 1 and 2 the hollow stem 22 of the plunger is slidable in the barrel 17 and through the reservoir being provided with a longitudinal slot 23 adapted to admit fluid from reservoir 16 into hollow stem 22 to flow through the bore 21<sup>a</sup> of plunger 21. A valve 24 is shown carried by a rod 25 having a float 26 guided within hollow stem 22, said ball being adapted to bear against the lower end of plunger 21 to close its bore 21<sup>a</sup> as the plunger descends. When plunger 21 and stem 22 rise valve 24 will be unseated to permit material 15 to flow through the bore of the plunger into the space between the needle and the plunger in barrel 17. Stem 22 is shown connected by link 27 with a lever 28 pivotally supported upon a bracket 29, a spring 30 connecting said lever with said bracket serving normally to raise the lever and the plunger. The needle 14 is shown secured by a plug 31 to the bottom of barrel 17. The reservoir 16 and barrel 17 are rigidly supported by bracket 29 as shown in Fig. 1, whereby needle 14 is rigidly held so that when ball 3 is raised by support 4 said ball may be pushed by the support against the needle to cause the latter to pierce the ball. When molten metal or other suitable heavy metal is to be used for balancing the balls the needle 14 may be inclosed within a flexible protector 32, such as a rubber shell, attached to the lower end of barrel 17 to prevent circulation of air around the needle and radiation of heat therefrom, the needle passing through a hole in the bottom of the protector, said protector being flexible and collapsible when the ball is forced against the needle. When molten material is used for balancing the ball the receptacle 1 may be heated so that the material or solution therein may be kept warm as well as the ball floating therein, so as to prevent the material 15 from solidifying too soon when being injected into the ball and to permit withdrawal of the needle from the ball before such material solidifies. The receptacle 1 may be provided with a jacket 1<sup>a</sup> having an inlet 1<sup>b</sup> and outlet 1<sup>c</sup> for hot water or steam to keep the reservoir at the desired temperature.

In Figs. 4 and 5 the needle 14 is secured at the lower end of a barrel 33 containing plunger 21 whose stem 22 is connected by a link 27 with lever 28 in manner before described. The barrel 33 is rigidly supported upon bracket 29 over reservoir 1, whereby when support 4 raises ball 3 the latter may be forced against the needle to pierce the ball. Reservoir 33<sup>a</sup> for the metal communicates through port 33<sup>b</sup> with barrel 33. Plunger 21 will control the flow of metal from reservoir 33<sup>a</sup> to the lower part of the barrel to be pushed by the plunger through the needle.

The ball to be balanced is placed in bath 2 over support 4 which is depressed free from the ball to permit it to float in the bath. The lighter side of the ball, when the latter is floated in the bath, will extend upwardly beneath the needle. When the lighter side of the ball has been ascertained support 4 will be raised to push the ball against the needle to cause the latter to enter the ball so that the outlet 14<sup>c</sup> of the needle will be within the ball, and thereupon plunger 21 will be depressed to force material 15 from the needle into the ball, as indicated in Fig. 5. The ball will then be removed from the needle and may be tested for balance in bath 2. If sufficient material has not been injected into the ball at the first operation testing of the ball and injecting of more material therein may be continued as may be necessary until the ball is brought to balance. In a golf ball 34 having an inner core 34<sup>a</sup>, a winding 34<sup>b</sup> of relatively wide rubber bands and a winding 34<sup>c</sup> of narrow bands of rubber, all inclosed within an outer shell 34<sup>d</sup>, usual in golf balls, the needle 14 will pierce shell 34<sup>d</sup> and enter the windings 34<sup>c</sup> so that the outlet 14<sup>c</sup> of the needle will be within said shell, (Fig. 3), whereby the loading material 15 for the ball will be forced beneath the shell and between the interstices of the windings 34<sup>c</sup> to add weight to the ball on its lighter side and to be caused to remain in such interstices. The aperture made by the needle in shell 34<sup>d</sup> of the ball may, if desired, be closed by a plug of any suitable material, though when molten metal has been injected into the ball and become solidified therein such metal will remain within the ball without danger of flowing out of the aperture. Usually the needle upon entering will simply press aside the material of the shell and this will return by its resiliency and close the aperture, this being the object of placing the outlet at one side of the needle point to avoid removing a plug from the hole as would be done with a needle with the outlet at the end, such as a needle in a physician's hypodermic syringe.

In this application I do not claim the balanced ball herein described as the same is the subject of my application for Letters Patent filed May 3rd, 1921, Serial No. 466,605.

Having now described my invention, what I claim is:—

1. The method of balancing a ball consisting in ascertaining the lighter side of the ball and injecting material into such side of the ball to add weight thereto.

2. The method of balancing a ball having inner interstices consisting in ascertaining the lighter side of the ball and injecting material into the interstices within the ball to add weight to the ball.

3. The method of balancing a golf ball having interstices consisting in floating the ball in a fluid to ascertain its lighter side and then adding loading material to the interstices in said lighter side of the ball to add weight thereto.

4. The method of balancing a ball consisting in floating the ball in a fluid, forcing a hollow needle into the lighter side of the ball, and forcing material through the needle into the ball to add weight thereto.

5. The method of balancing a ball consisting in floating the ball in a fluid beneath a hollow needle, raising the ball in the fluid against the needle, causing the latter to enter the ball, forcing fluid under pressure through the needle into the ball to add weight thereto, and separating the needle and ball.

6. An apparatus for balancing a ball comprising a receptacle for fluid, a hollow needle opposing the ball in the receptacle, means to cause the needle to pierce the ball, and means to force material through the needle into the ball.

7. An apparatus for balancing a ball comprising a receptacle for fluid, a support for the ball movable in the receptacle, a hollow needle supported over said support, means to move the support toward and from the needle, and means to force material through the needle into the ball.

8. An apparatus for balancing a ball comprising a receptacle for fluid, a support for the ball within the receptacle, a reservoir for material, a hollow needle communicating with the reservoir and located over the receptacle, and means to force fluid from said reservoir through the needle into the ball.

9. An apparatus for balancing a ball comprising a receptacle for fluid, a reservoir having a barrel communicating therewith, a plunger in the barrel adapted to control said communication, and a needle over the receptacle communicating with the barrel.

10. An apparatus for balancing a ball comprising a receptacle for fluid, a reservoir having a barrel communicating therewith, a plunger in the barrel adapted to control said communication, and a needle over the receptacle communicating with the barrel, and a movable support in the receptacle beneath the needle for the ball.

11. An apparatus for balancing a ball comprising an open top receptacle for fluid, a reservoir for fluid provided with a barrel communicating with the reservoir, a plunger slidable in the barrel and provided with a bore, a valve to close said bore on the operating stroke, means to actuate the plunger, and a needle communicating with the barrel.

12. An apparatus for balancing a ball comprising an open top receptacle for fluid, a reservoir for fluid provided with a barrel communicating with the reservoir, a plunger slidable in the barrel and provided with a bore, a valve to close said bore on the operating stroke, means to actuate said plunger, a float connected with said valve, and a needle communicating with the barrel.

13. An apparatus for balancing a ball comprising a receptacle for fluid, a reservoir provided with a barrel, a hollow needle secured at the lower end of the barrel, a plunger within said barrel provided with a hollow stem projecting through the reservoir, said stem having a slot above the plunger, said plunger having a bore, a valve to close the bore, a float within the stem connected with the valve, means to actuate said stem, and a needle communicating with the barrel.

14. An apparatus for balancing a ball comprising a receptacle for fluid, a reservoir for fluid above the receptacle provided with a jacket, a hollow needle connected with said reservoir, a plunger to force fluid from the reservoir through the needle, means to operate the plunger, and a flexible protector enclosing the needle adapted to be engaged by the ball on said support.

Signed at New York city, in the county of New York, and State of New York, this tenth day of January, A. D. 1921.

ROBERT FLEMING ARNOTT.